United States Patent
Chomel et al.

(10) Patent No.: US 12,479,151 B2
(45) Date of Patent: Nov. 25, 2025

(54) METHOD FOR THERMALLY CONDITIONING PREFORMS

(71) Applicant: SIDEL PARTICIPATIONS, Octeville-sur-Mer (FR)

(72) Inventors: Nicolas Chomel, Octeville-sur-Mer (FR); Denis Souffes, Octeville-sur-Mer (FR); Guy Feuilloley, Octeville-sur-Mer (FR); Vincent Brachet, Octeville-sur-Mer (FR); Marc Mouchelet, Octeville-sur-Mer (FR)

(73) Assignee: SIDEL PARTICIPATIONS, Octeville-sur-Mer (FR)

( * ) Notice: Subject to any disclaimer, the term of this patent is extended or adjusted under 35 U.S.C. 154(b) by 299 days.

(21) Appl. No.: 18/200,603

(22) Filed: May 23, 2023

(65) Prior Publication Data

US 2024/0092010 A1    Mar. 21, 2024

(30) Foreign Application Priority Data

Jun. 1, 2022 (FR) ..................................... 2205249

(51) Int. Cl.
*B29C 49/68* (2006.01)
*B29C 49/42* (2006.01)
*B29C 49/64* (2006.01)

(52) U.S. Cl.
CPC .... *B29C 49/6418* (2013.01); *B29C 49/42065* (2022.05); *B29C 49/42071* (2022.05)

(58) Field of Classification Search
CPC .......... B29C 49/6418; B29C 49/42065; B29C 49/42071; B29C 49/68; B29C 49/681; B29C 49/683
See application file for complete search history.

(56) References Cited

U.S. PATENT DOCUMENTS

| | | | |
|---|---|---|---|
| 10,363,697 B2 | 7/2019 | Lahogue et al. | |
| 11,472,094 B2 * | 10/2022 | Lahogue | ................ B29C 49/68 |
| 11,548,202 B2 * | 1/2023 | Lahogue | ........... B29C 49/42845 |
| 2022/0032528 A1 | 2/2022 | Lahogue | |
| 2022/0106178 A1 | 4/2022 | Mauboussin | |

FOREIGN PATENT DOCUMENTS

DE     102005060429 B4 *   6/2020   ......... B29C 49/6418

OTHER PUBLICATIONS

French Search Report dated Jan. 20, 2023.

* cited by examiner

*Primary Examiner* — Gregory A Wilson
(74) *Attorney, Agent, or Firm* — Blake T. Hudson; Stephanie Davy-Jow

(57) ABSTRACT

Provided is a thermal conditioning method of preforms. The method includes heating each preform by transport along a heating path exposed to heating radiation with a determined production rate; transporting the preforms (in line along a diffusion path; transforming the preforms in forming units at the determined production rate. The diffusion path includes a final buffer section along which the preforms travel for an adjustable duration.

15 Claims, 8 Drawing Sheets

[Fig. 1]
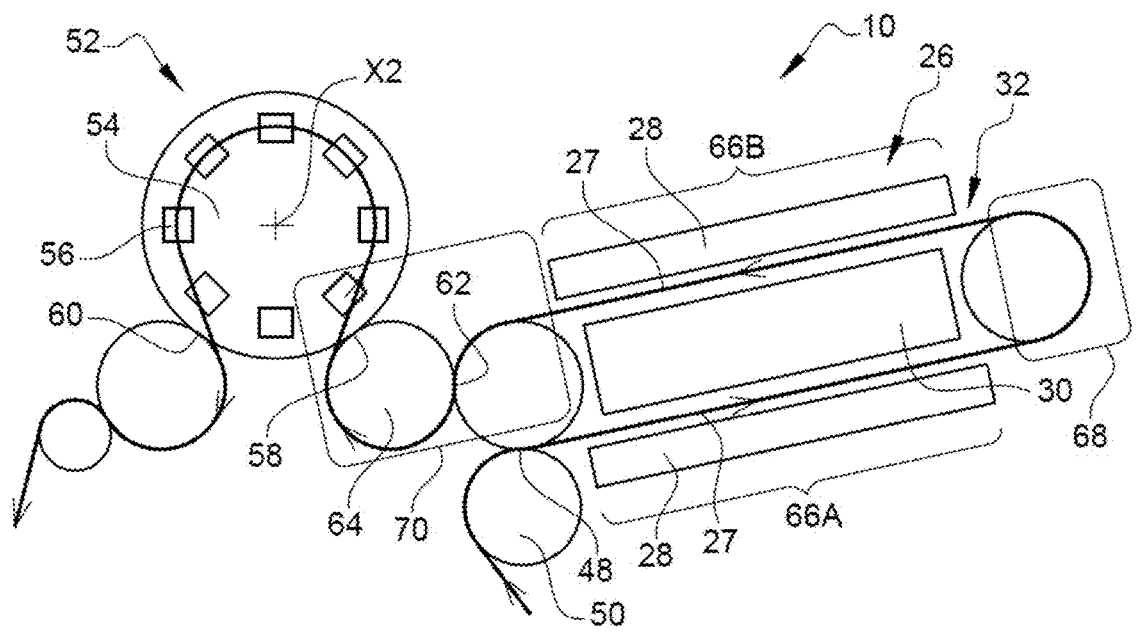
PRIOR ART
[Fig. 2]
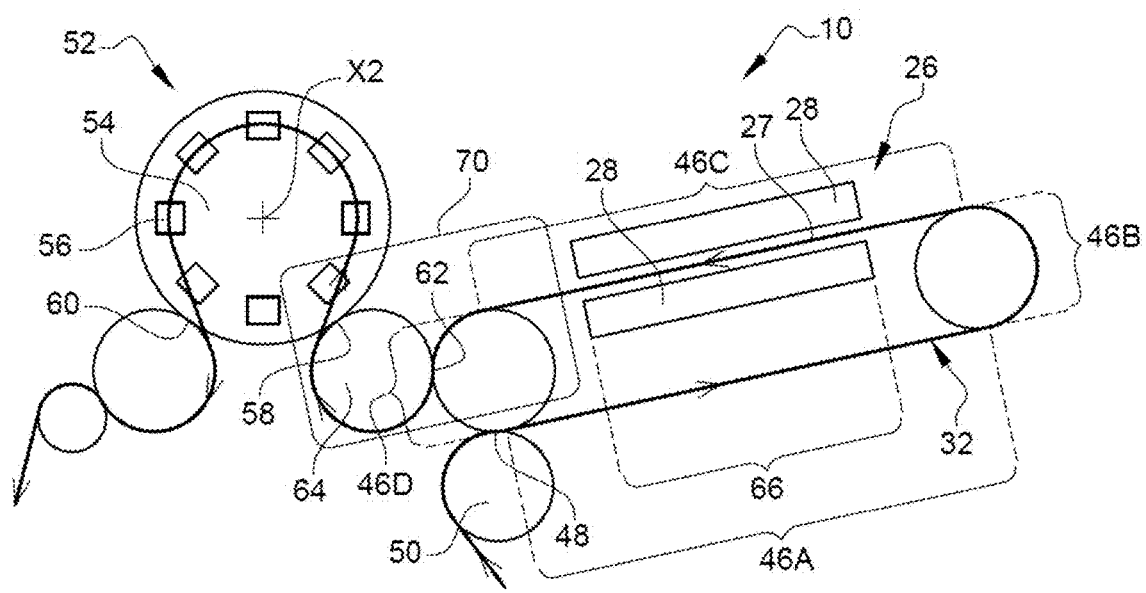
PRIOR ART

[Fig. 3]
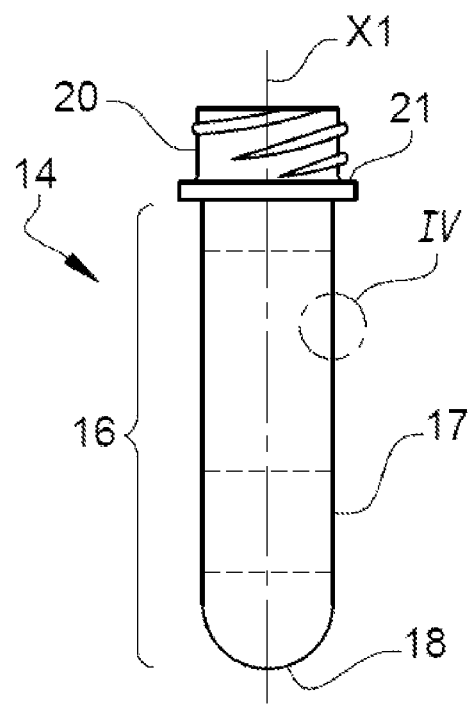
[Fig. 4]
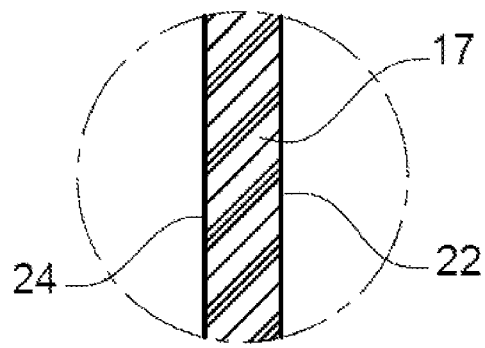

[Fig. 5]
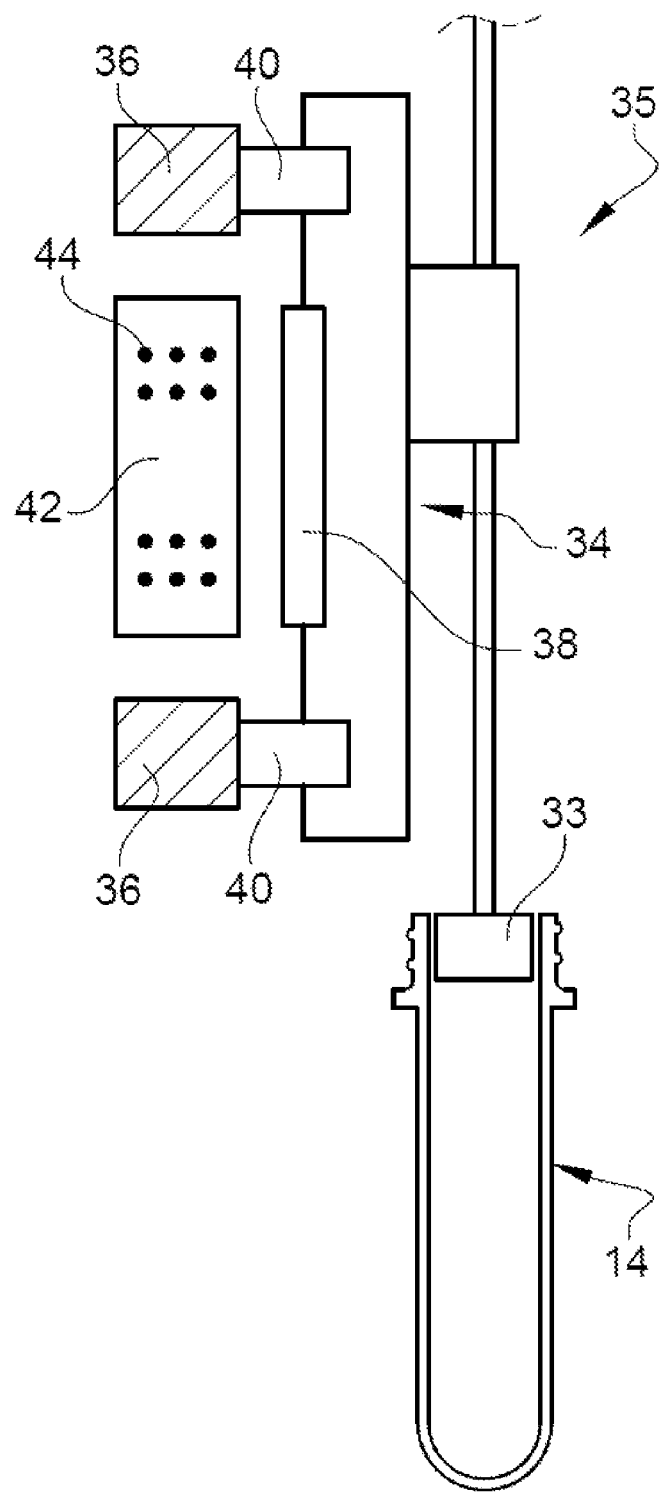

[Fig. 6]
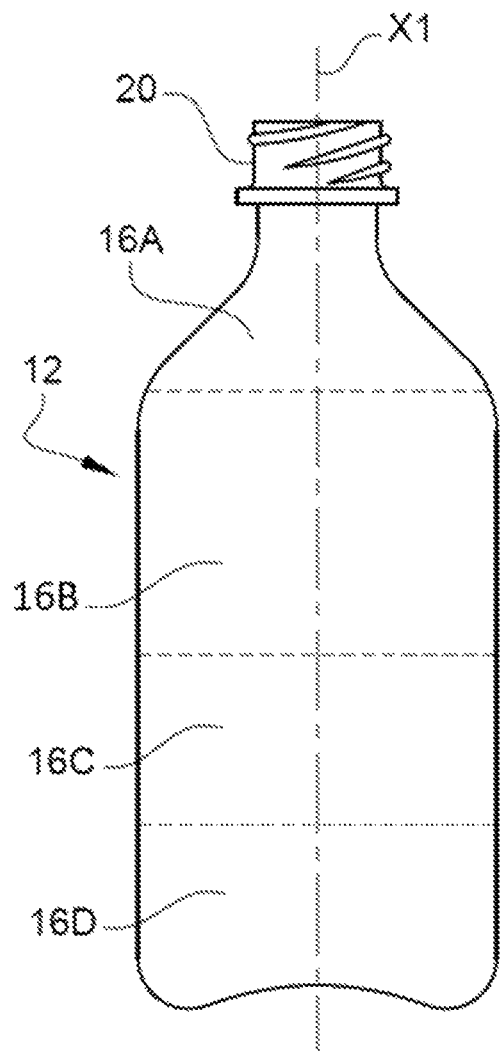

[Fig. 7]
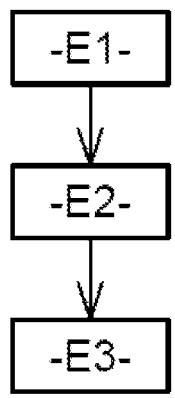
[Fig. 8]
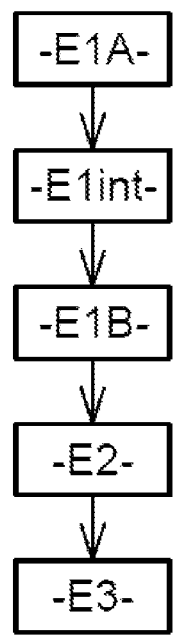

[Fig. 9]
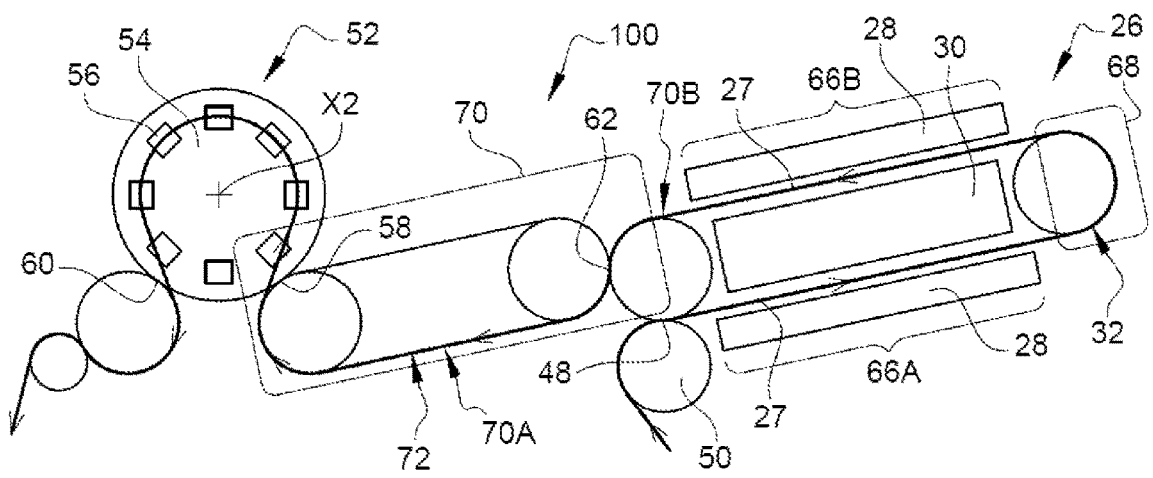
[Fig. 10]
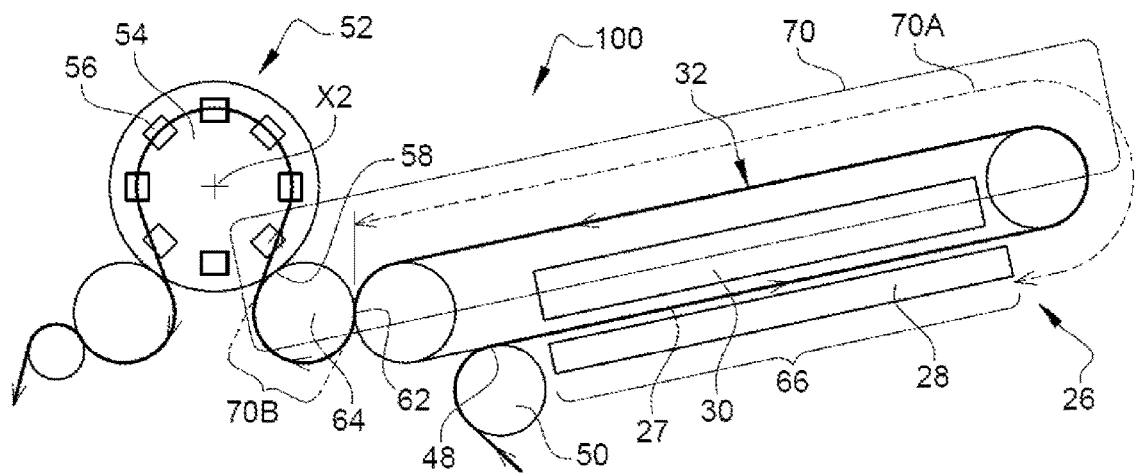

[Fig. 11]
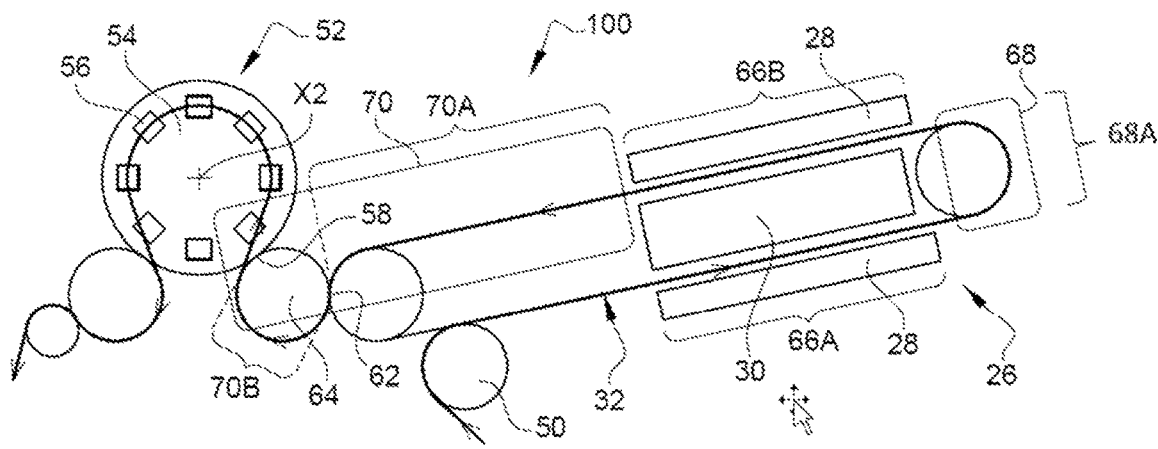
[Fig. 12]
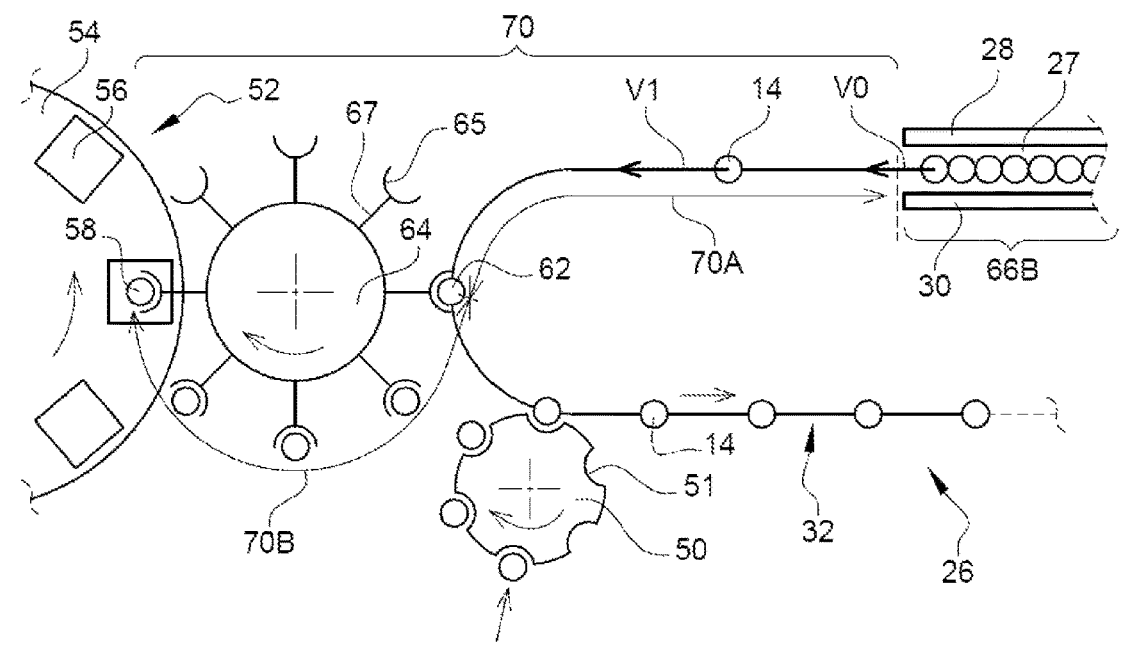

[Fig. 13]
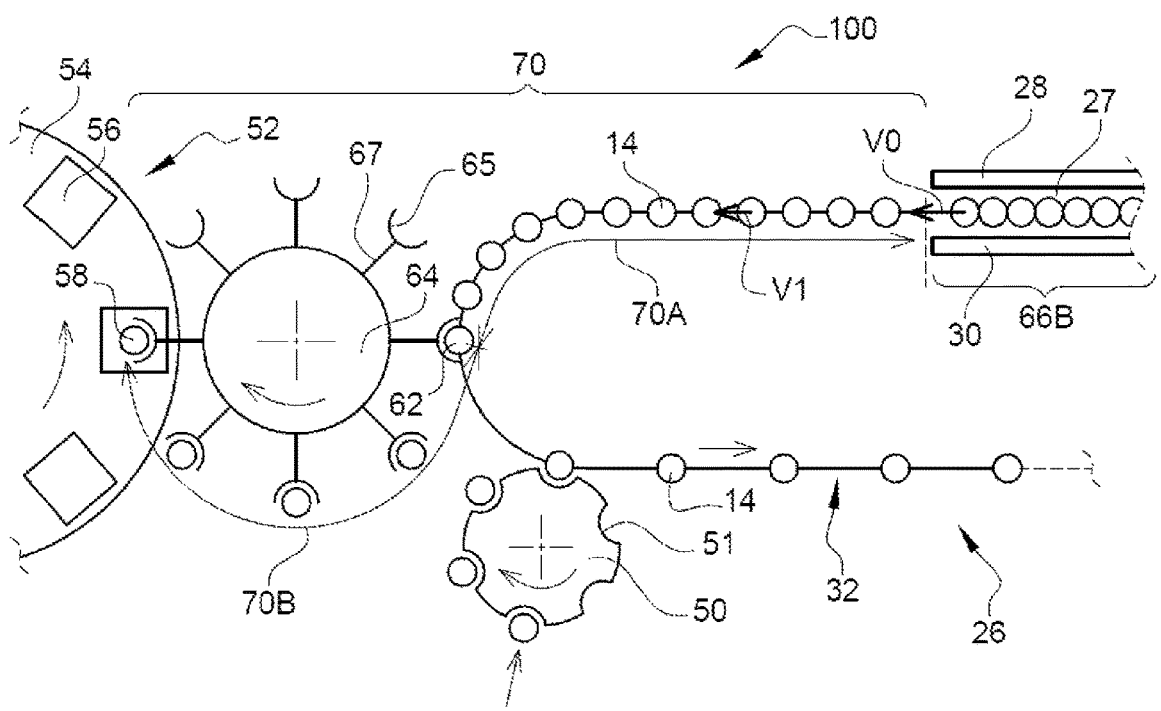

METHOD FOR THERMALLY CONDITIONING PREFORMS

CROSS-REFERENCE TO RELATED APPLICATIONS

This application claims priority to French application having serial number FR2205249 filed on Jun. 1, 2022, which is entirely incorporated herein by reference.

TECHNICAL FIELD OF THE INVENTION

The invention relates to a method for thermally conditioning preforms before they are formed, in particular by stretch blow-molding in a container production facility.

TECHNICAL BACKGROUND

It is known practice to manufacture containers by forming, in particular by stretch blow-molding, preforms made from a thermoplastic material. The material forming the preforms is generally in an amorphous state that is not suitable for allowing the cold forming thereof. Prior to the forming operation, the preforms are therefore heated to a glass transition temperature that makes it possible to shape them into final containers.

More particularly, the preforms generally have a substantially cylindrical body of revolution with a thick tubular wall that is closed at one of its axial ends by a thick-walled base, and extended at its other end by a neck, which is also tubular. The neck is shaped into its final form and dimensions, while the body of the preform is intended to undergo relatively significant deformation in order to shape it into a container during a forming step.

For this reason, preferably only the body of the preform is heated beyond the glass transition temperature, with the neck remaining at a lower temperature than said glass transition temperature to prevent it from deforming during the manufacturing of the container.

In addition, the temperature of the body must likewise not exceed a crystallization temperature that is higher than the glass transition temperature. Beyond this crystallization temperature, the thermoplastic material crystallizes and no longer has the mechanical properties making it possible to carry out forming of the required quality. It is important that the crystallization of the material is only caused, in a controlled manner, during the forming operation, so that the polymer chains are oriented in required directions.

The mass manufacturing of containers takes place in a production facility comprising a heating station that makes it possible, in a heating step, to render the body of the preform malleable by heating beyond the glass transition temperature. In the heating step, each preform is transported along a heating path exposed to heat radiation.

The production facility also comprises a forming station that is arranged downstream of the heating station in the direction of travel of the preforms in the production facility. In the forming step, the hot preform is placed in a forming unit, for example in a mold of the forming station that has a mold cavity in the shape of the container to be obtained. A pressurized fluid, such as air, is injected into the malleable body of the preform so as to press the wall of the preform against the mold cavity. Generally, the injection of pressurized fluid is preceded and/or accompanied by axial stretching of the preform, in particular by means of a stretching rod inserted into the preform. As is known, the body is thus subjected to biaxial stretching.

Between the heating step and the forming step, each preform is transported along a diffusion path that is not exposed to the heat radiation and extends from a downstream end of the heating path to the forming station. During this transport, the preforms passively undergo a step of diffusion of the heat stored in their walls. This step in particular allows the heat to diffuse in the thickness of the wall of the preform so as to obtain optimum distribution of the heat.

For example, at the time of forming, the wall of the preform preferably has an increasing temperature gradient in the direction of its thickness from its outer face towards its inner face. This gradient is produced by passive diffusion of the heat through the wall towards the inside of the preform during the diffusion step.

Following this diffusion step, each preform is transferred to forming units of the forming station in a transfer step.

The temperature of the preforms throughout their movement in the production facility is an essential parameter that it is important to control in order to obtain a high-quality container following the forming step.

For example, if a portion of the body of a preform is too cold during the forming operation, this can degrade the quality of the container obtained, or even pierce the container. So that the preform does not cool down, it is therefore important that the duration of the diffusion step, hereinafter referred to as the "diffusion duration", is fairly short and/or that the amount of heat accumulated in the preform is sufficient.

Conversely, if a portion of the body of the preform is too hot, crystallizations of the material can occur before it is formed, causing significant degradation of the quality of the container produced. Such crystallization can take place during heating, or even during the transport of the preform from the heating station to the forming station. The latter can occur when the preform has stored a large amount of heat in its thickness and the diffusion duration is too great.

In addition, for the manufacturing of some containers, the body of the preforms is divided into a plurality of zones that must be heated to different temperatures in order to control the distribution of the thermoplastic material during the forming operation. A zone heated to a high temperature will tend to be able to be stretched with less effort than a zone heated to a lower temperature. The diffusion step must therefore be long enough to obtain optimum distribution of the temperature in each zone, but short enough so that the thermal boundary between two zones remains sufficiently clear.

In order to solve these problems, it is therefore known practice to control the power of the heating means of the heating station and the ventilation means in order to avoid overheating the outer face of the preform, for example when the heating means are infrared lamps.

In addition, the diffusion duration is dependent on the production rate of the forming station, as explained below.

The preforms are transported along the diffusion path by conveying means comprising individual members for gripping each preform. A pitch between two successive preforms is determined as being the distance between these two preforms in the direction of travel along the diffusion path. At each point of the diffusion path, the pitch between two preforms is set independently of the operating rate of the blow-molding station.

In some production facilities, the pitch is the same at all locations on the diffusion path. For other production facilities, the pitch might not be the same at different points of the circuit. Even if the pitch changes along the diffusion path, it remains invariable over time at each point of the diffusion path.

The speeds of the preforms can thus vary in proportion to the production rate, but the pitch remains independent of the speed at each point of the diffusion path.

For a very long time, this property was imposed by the structure of the conveying means, and this remains the case today in the majority of production facilities. It is in particular the case when the gripping members are mechanically connected to each other. The conveying means of the heating station are thus often formed by a chain of gripping members articulated with respect to each other, and the conveying means between the heating station and the forming station are formed by at least one wheel comprising on its periphery gripping members that are fixed, or held by arms.

Even when the arms are articulated to allow a change of pitch between the preforms, the movement of the arms is controlled by fixed cams that do not make it possible to change the pitch between two preforms as a function of the production rate.

Conveying means with a linear motor have recently come into existence, in which the gripping means are held by independent shuttles. These conveying means are in particular used to make it possible to increase the efficiency of the heating tunnel by grouping the preforms as tightly as possible during heating, then separating them to the required pitch for their transfer to the downstream conveying means at the output of the heating station. However, neither the distance travelled by the shuttles after they exit the heating tunnel nor the control law of the shuttles make it possible to adjust the diffusion duration independently of the production rate.

Whatever the embodiment of the production facility, the diffusion duration varies in proportion to the production rate. It is therefore known practice to adjust the production rate so that the diffusion duration remains within a range of values in which the quality of the container obtained is acceptable. As a result, the production rates at which the production facility can operate are limited to an operating range restricted in particular by the diffusion duration. In the production facilities of the prior art, the production rate thus forms a control setpoint of the production facility, while the diffusion duration only forms a constraint that limits the operating range within which the production rate can vary. A setpoint is defined as being a parameter on which an operator can act directly, for example by entering a value into a control panel. Conversely, a constraint is not a parameter on which an operator can act. A constraint only limits the values that the operator can assign to a parameter, here the production rate.

The value range of the diffusion duration is generally set by the structural features of the production facility, in particular the length of the diffusion path, which is kept relatively short, in particular due to the costs of manufacturing the production facility.

Whatever the conveying means used, a person skilled in the art has thus never considered that the diffusion duration could form a control setpoint independent of the production rate in order to improve the quality of the container obtained.

The operating range of the machine is therefore currently changed by changing the length of the diffusion path. Such changes are very costly and the diffusion duration remains dependent on the production rate.

There is therefore a need to extend the operating range of container production facilities.

In addition, there is a need to produce containers of strictly the same quality, independently of the production rate applied.

SUMMARY OF THE INVENTION

The invention relates to a method for thermally conditioning preforms before they are formed, in particular by stretch blow-molding, in a container production facility, the method comprising:

at least a first step of heating each preform by transport along a heating path exposed to heat radiation, the preforms exiting the heating path at a predetermined production rate;

a second step of diffusing the heat stored in each preform during which the preforms are transported in a line along a diffusion path that is not exposed to the heat radiation and extends from a downstream end of the heating path to a station for forming the preforms;

a third step of transferring the preforms, following the diffusion step, into forming units of the forming station at said predetermined production rate, characterized in that the diffusion path comprises at least one final buffer section that the preforms travel along in an adjustable duration.

According to another aspect of the invention, the duration of the diffusion step, known as the "diffusion duration", is controlled independently of the production rate by adapting the adjustable duration.

According to another aspect of the invention, a diffusion duration setpoint is selected, the adjustable duration being controlled automatically as a function of the production rate to keep the diffusion duration equal to the setpoint independently of the production rate.

According to another aspect of the invention, the adjustable duration is controlled so that the diffusion duration is identical for each preform.

According to another aspect of the invention, the adjustable duration can adopt a plurality of values in a range delimited by a minimum lower limit and an upper limit for a given production rate.

According to another aspect of the invention, the lower limit depends on the length of the final buffer section and the maximum speed that the preform can reach at each point of the final buffer section.

According to another aspect of the invention, the upper limit depends on the length of the final buffer section and the production rate.

According to another aspect of the invention, the production rate can be controlled between a maximum rate and a minimum rate during the production of containers, the length of the final buffer section and/or the maximum speed of the preforms on the final buffer section being determined so that the adjustable duration can be controlled so that at least one diffusion duration value can remain constant for any production rate between the maximum rate and the minimum rate.

According to another aspect of the invention, the preforms are transported along the final buffer section by shuttles moved independently of each other by means of a linear motor or a pneumatic device.

According to another aspect of the invention, the preforms travel along the final buffer section with an identical speed profile.

According to another aspect of the invention, the preforms are transferred in succession one by one into the forming station.

According to another aspect of the invention, a predetermined number of a plurality of successive preforms form a group, the preforms in a single group being transferred simultaneously into the forming station.

According to another aspect of the invention, the successive preforms in a single group travel along the final buffer section with different speed profiles so that the diffusion duration is the same for all of the preforms in the group.

According to another aspect of the invention, the heating step comprises two successive heating sub-steps prior to the diffusion step, the two heating sub-steps being separated by an intermediate step of transporting the preforms in a line, the heating path being divided into an upstream heating section and a downstream heating section connected by a transition path.

According to another aspect of the invention, the transition path comprises at least one intermediate buffer section that the preforms travel along in an adjustable duration that is controlled independently of the production rate.

BRIEF DESCRIPTION OF THE FIGURES

Further features and advantages of the invention will become apparent on reading the following detailed description, which will be more clearly understood with reference to the appended drawings, which are briefly described below.

FIG. 1 is a top view schematically showing a first facility for producing containers according to the prior art.

FIG. 2 is a similar view to FIG. 1 showing a second facility for producing containers according to the prior art.

FIG. 3 is a side view showing an example of a preform suitable for being handled by container production facilities according to the invention.

FIG. 4 is a larger-scale detailed cross-sectional view showing the preform wall portion surrounded by the circle IV in FIG. 3.

FIG. 5 is a transverse cross-sectional view relative to the direction of travel of the preforms showing preform conveying means with a linear motor implemented in the production facilities according to the teachings of the invention.

FIG. 6 is a side view showing a final container obtained after forming the preform in FIG. 3 in a container production facility.

FIG. 7 is a block diagram showing a first embodiment of a method for thermally conditioning preforms in a production facility according to the teachings of the invention.

FIG. 8 is a block diagram showing a second embodiment of a method for thermally conditioning preforms in a production facility according to the teachings of the invention.

FIG. 9 is a top view schematically showing a first embodiment of a container production facility suitable for implementing the thermal conditioning method according to the teachings of the invention.

FIG. 10 is a top view schematically showing a second embodiment of a container production facility suitable for implementing the thermal conditioning method according to the teachings of the invention.

FIG. 11 is a top view schematically showing a third embodiment of a container production facility suitable for implementing the thermal conditioning method according to the teachings of the invention.

FIG. 12 is a top view showing a diffusion path travelled along by the preforms in the production facility in FIG. 9, the preforms travelling along a final buffer section of the diffusion path in a minimum duration.

FIG. 13 is a top view showing a diffusion path travelled along by the preforms in the production facility in FIG. 9, the preforms travelling along a final buffer section of the diffusion path in a minimum duration.

DETAILED DESCRIPTION OF THE INVENTION

In the description hereinafter, elements with an identical structure or similar functions will be denoted by the same reference sign.

FIGS. 1 and 2 schematically show facilities 10 for mass producing containers 12 made from a thermoplastic material from preforms 14. These production facilities 10 shown in FIGS. 1 and 2 are built according to the prior art.

In the description hereinafter, the preforms 14 travel in the production facility 10 along a production route from upstream to downstream. The preforms 14 are moved in a line along the production route by conveying means that will be described in detail hereinafter.

In a non-limiting manner, here the containers 12 are bottles. Here, the thermoplastic material is formed by polyethylene terephthalate, denoted hereinafter by its acronym "PET".

FIG. 3 shows an example of such a preform 14. The preform 14 has a main axis "X1" shown vertically in FIG. 3. It has a cylindrical body 16 with a tubular wall 17 closed at one of its axial ends by a base 18, shown here at the bottom of the figure, and open at its other end via a neck 20, which is also tubular. At its base, here the neck 20 has a collar 21.

As shown in a detailed view in FIG. 4, the wall 17 is delimited by an outer face 22 and an inner face 24. The neck 20 is generally in its final form, while the body 16 of the preform 14 is intended to undergo relatively significant deformation to form the final container 12 during a forming step.

With reference to FIGS. 1 and 2, the production facility 10 according to the prior art comprises a station 26 for heating the preforms 14. By way of non-limiting example, the heating station 26 comprises at least one heating tunnel 27 in which are arranged heating emitters 28 emitting heat electromagnetic radiation, for example infrared radiation. The function of these heating emitters 28 is to heat the body 16 of the preforms 14 beyond a glass transition temperature to render them sufficiently malleable with a view to forming them. The body 16 of the preforms 14 must however remain at a lower temperature than a crystallization temperature.

In the example shown in FIG. 1, the heating emitters 28 are formed by halogen lamps. In this case, the heating station 26 generally comprises two heating tunnels 27 so that the preforms 14 can receive a sufficient exposure time to the heat radiation.

The heat radiation emitted by such heating emitters 28 is generally absorbed mostly on the outer face 22 of the preforms 14. As a result, the outer face 22 can overheat before the wall 17 has absorbed the amount of heat necessary for the entire wall 17 to be heated beyond the glass transition temperature. The heating tunnels 27 are therefore generally provided with ventilation means 30 the aim of which is to cool the outer face 22 of the preforms 14 to avoid them overheating, which can result in the crystallization thereof for example. In the example shown in FIG. 1, the heating emitters 28 are arranged on one side of the associated heating tunnel 27 while the ventilation means 30 are arranged on an opposite side of the heating tunnel 27.

In a variant shown in FIG. 2, such a production facility 10 according to the prior art comprises heating emitters 28 formed by laser emitters. The heat radiation emitted by such heating emitters 28 generally penetrates more deeply into the thickness of the wall 17. As a result, the preforms 14 do not need as long an exposure duration as with halogen lamps to absorb the amount of heat required to form them. The production facility 10 in FIG. 2 therefore comprises a single heating tunnel 27 shorter than the cumulative length of the two heating tunnels 27 of the production facility 10 shown in FIG. 1. As a consequence of this shorter exposure, the production facility 10 shown in FIG. 2 likewise does not comprise ventilation means as the risk of the preform 14 overheating is low or even zero. It is therefore possible to arrange heating emitters 28 on both sides of the heating tunnel 27.

In each of the production facilities 10 shown in FIGS. 1 and 2, the heating station 26 also comprises a device 32 for conveying the preforms 14 on part of their route. The conveying device 32 is in particular arranged so as that they run along the heating tunnel 27. The running direction of the preforms 14 is indicated by the arrows in FIG. 1.

The conveying device 32 comprises gripping members 33 each of which is capable of individually grasping a preform 14, generally by its neck 20. Such a gripping member 33 is for example formed by a chuck that is inserted inside the neck 20 of the preform 14 and then tightened by radial expansion, as shown in FIG. 5. There are several types of conveying device 32.

The gripping members 33 are for example held by the links of an endless chain that circulates around two guide wheels, one of which is a drive wheel. In this case, all of the gripping members 33 circulate simultaneously at the same speed.

As a variant, the conveying device 32 is at least partially formed by a linear motor 35.

An exemplary embodiment of such a linear motor 35 is shown in FIG. 5. The gripping members 33 are held by independent shuttles 34. The linear motor 35 comprises rails 36 for guiding the shuttles 34, for example by means of rollers 40 held by the shuttles 34. The linear motor 35 also comprises a magnetic track 42 arranged along the rails 36. The magnetic track 42 forms a stator comprising a series of windings 44 that are distributed along the magnetic track 42. Each winding 44 is individually controlled to locally cause a magnetic field independently of the other windings. The windings 44 are for example controlled by an electronic control unit (not shown) programmed appropriately. By appropriately controlling the windings 44 of the magnetic track 42, a magnetic field is created locally to produce, by interaction with the magnet 38, a magnetic force for moving each shuttle 34 along the rails 36. In this case, it is possible to individually control the movements of each shuttle 34 along the magnetic track 42.

Whatever the embodiment of the conveying device 32, the gripping members 33 circulate in a line along a closed loop 46. As illustrated for example in FIG. 2, here the loop has an upstream straight portion 46A and a downstream straight portion 46C that are parallel. The straight portions 46A, 46C are joined by two 180° bend portions 46B, 46D.

The preforms 14 are conveyed in a line to an entry point 48 of the heating station 26 by a transport wheel 50. This is generally a wheel 50 comprising notches 51 on its periphery, known as a "notched wheel", as illustrated schematically in FIG. 12. Each notch 51 receives the body 16 of the preform 14 and the weight of the preform 14 is supported by its collar 21.

The entry point 48 is situated on a bend portion 46D of the loop 46 of the conveying device 32.

When they exit the heating tunnel 27, the body 16 of each preform 14 has been rendered malleable by heating beyond a glass transition temperature, while the neck 20 is kept at a sufficiently low temperature to retain its original form.

The production facilities 10 in FIGS. 1 and 2 also comprise a station 52 for forming the preforms 14 heated in this way. The forming station 52 is arranged downstream of the heating station 26 with reference to the flow of preforms 14 in the production facility 10.

Here, the forming station 52 comprises a carousel 54 holding a plurality of forming units 56. The carousel 54 is mounted rotatably about a central axis "X2". Each forming unit 56 is thus suitable for moving the preforms 14/final containers 12 about the axis "X2" of the carousel 54 between a loading point 58 of the preforms 14 and an unloading point 60 of the final containers 12 in order to start a new cycle.

Each forming unit 56 generally comprises a mold (not shown) in which at least one preform 14 is intended to be received, and forming means (not shown). The forming means are generally formed by a nozzle that is capable of injecting a pressurized fluid, in particular air, into the preforms 14 received in the mounds. To make it possible to obtain a satisfactory distribution of the thermoplastic material in the final containers 12, the forming means optionally comprise a stretching rod that is intended to be inserted inside the preform 14 to cause it to stretch in an axial direction by contact with the base 18.

The production facility 10 generally comprises means for transporting the hot preforms 14 that move them along part of their route from an exit point 62 of the heating station 26 to the loading point 58 into a forming unit 56 of the forming station 52. Here, the exit point 62 of the heating station 26 is situated on the same bend portion 46D of the loop at the entry point 48.

By way of non-limiting example, such transport means generally comprise a transfer wheel 64. The periphery of the transfer wheel 64 is provided with grippers 65 that are capable of grasping each preform 14 by its neck 20, as illustrated schematically in FIG. 12. Only the neck 20 of the preform 14 is suitable for being grasped as the body 16 of the preform 14 has been made malleable by heating. So that the pitch between two preforms 14 can be adapted to the pitch required in the forming station 52, the grippers 65 are generally held by means of arms 67 mounted pivotably on the transfer wheel 64, also illustrated in FIG. 12. The grippers 65 can also be mounted slidably along the arms 67. The movement of the arms 67 is then controlled by a cam control mechanism so that all of the preforms 14 follow the same speed profile during their transfer. In the examples shown in FIGS. 1 and 2, the grippers 65 grasp the preforms at the exit point 62 of the forming station 52, thus taking over from the conveying device 32, and then deposit the preforms in the associated forming unit 56 of the forming station 52.

When they pass through the heating station 26, the body 16 of each preform 14 is heated according to a desired heating profile in the heating station 26.

As a variant of the invention, the body 16 of each preform 14 is heated in a differentiated manner according to specific zones of the body 16, known as "differentiated heating zones". FIG. 6 thus shows a final container 12 obtained by forming the body 16 of the preform 14. In the non-limiting example shown in FIG. 6, here, the body 16 of the final container 12 is divided into a plurality of differentiated heating zones in the axial direction.

A first zone 16A of the body 16 of the final container 12 situated directly under the neck 20 has a conical shape. The geometry of this first zone 16A gives it mechanical properties such that it is not necessary for the material of its wall 17 to be very thick.

Just below this first zone 16A is a largely cylindrical second zone 16B that generally corresponds to the location where a user will grasp the final container 12. As a result, this second zone 16B must have mechanical strength properties that allow it to be gripped without crushing the final container 12. The wall 17 of this second zone 16B is generally thicker than in the first zone 16A. For example, the wall 17 is thicker and/or the wall 17 has ridges to increase its crush resistance.

Just below this second zone 16B is a largely cylindrical third zone 16C. This third zone 16C does not have a particular function. As a result, this third zone 16C is generally thinner than the second zone 16B.

Finally, just below this third zone 16C is a fourth base zone 16D that corresponds to the zone that supports the weight of the final container 12 and its contents. As a result, this fourth zone 16D must have mechanical strength properties that prevent it from being crushed under the effect of the weight. The wall 17 of this fourth zone 16D is generally thicker than in the first and third zones 16A, 16C. For example, the wall 17 is thicker and/or the wall 17 has ribs to increase its crush resistance.

According to other examples not shown, the final container can also have a non-axisymmetric shape. In this case, some zones, this time distributed angularly and not axially, of the body 16 of the preform 14 are intended to be more stretched than others. The heating of the preforms 14 according to such a temperature profile is generally referred to as "preferential heating".

It will therefore be understood that the material is not distributed uniformly along the main axis "X1" of the final container 12 during the forming operation. In this regard, the body 16 of the preform 14 is deformed in a differentiated manner according to the zones during the forming operation. As will be explained hereinafter, different differentiated heating zones of the body 16 of the preform 14 can therefore require heating to different temperatures. These zones are shown in FIG. 3 by dashed lines that divide the body 16 into four.

In addition, whether the body 16 of the preform 14 is heated evenly or in a differentiated manner, at the moment when the preforms 14 are formed, their walls 17 preferably have a temperature gradient in their thickness that increases from the outer face 22 towards the inner face 24 in the thickness direction. Such a gradient makes it possible to obtain a final container 12 of the required quality. In addition, a lower blowing pressure is required to form the preform 14 with such a temperature gradient.

To obtain a high-quality final container 12, it is thus known practice to subject each preform 14 to a thermal conditioning method illustrated in FIG. 7.

The production route is divided into a plurality of sections that will be referred to as paths hereinafter.

The thermal conditioning method conventionally comprises at least a first step "E1" of heating the body 16 of each preform 14 by transport along a heating path 66 exposed to heat radiation. Only the section of the production route on which the preforms 14 are exposed to the heat radiation emitted by the heating emitters 28 is referred to as the "heating path 66". The heating path 66 thus starts as soon as the preforms 14 are exposed to the heat radiation of the heating emitters 28 and ends as soon as the preforms 14 are substantially no longer exposed to the heat radiation of the heating emitters 28. The heating path 66 thus largely corresponds to the section of the production route that passes through the heating tunnel 27.

In addition, in the case of the production facility 10 shown in FIG. 1, which comprises two heating tunnels 27, the heating path 66 is divided into an upstream heating section 66A and a downstream heating section 66B. As illustrated in FIG. 8, the heating step "E1" is then divided into two successive heating sub-steps "E1A", "E1B". The two heating sub-steps "E1A", "E1B" are separated by an intermediate step "E1int" of transporting the preforms 14 in a line from a downstream end of the upstream heating section 66A to an upstream end of the downstream heating section 66B along a transition path 68. The upstream heating section 66A and the downstream heating section 66B are thus connected by the transition path 68. Along the transition path 68, the preforms 14 are not exposed to the heat radiation emitted by the heating emitters 28.

The conveying device 32 is controlled so that the preforms 14 exit the heating path 66 at a predetermined production rate "R", for example by an operator. This production rate "R" corresponds to the desired number of bottles to be produced per unit of time.

The first heating step "E1" is immediately followed by a second step "E2" of diffusing the heat stored in each preform 14 during the first heating step "E1". In this second diffusion step "E2", the preforms 14 are transported in a line along a diffusion path 70, shown in a box in the figures, that is not exposed to the heat radiation and extends from a downstream end of the heating path 66 to the station 52 for forming the preforms 14.

In this second diffusion step "E2", the heat accumulated in the body 16 of the preform 14 will diffuse in the wall 17 so as to produce the desired gradient in its thickness.

This diffusion step "E2" must thus last long enough to allow the establishment of this gradient, but it must not be so long that the boundary between the differentiated heating zones becomes too blurred. Likewise, it must not be too long in order to prevent the appearance of points in the body 16 that are too hot or too cold. It is generally accepted that the duration of this diffusion step "E2", referred to as the "diffusion duration "D"", must remain within a range determined as a function of the model of preform 14 in order to avoid the problems mentioned above while allowing the establishment of the desired temperature gradient.

Finally, at the end of this diffusion step "E2", the preforms 14, having arrived at the loading point 58, undergo a third step "E3" of being transferred into the forming units 56 of the forming station 52 at said predetermined production rate "R". This means that the preforms 14 exit the heating station 26 and enter the forming station 52 at the same production rate "R".

During this third transfer step "E3", the preforms 14 are, for example, placed on a forming support, in particular in a mold, of the forming unit 56. The diffusion path 70 thus ends when the preforms 14 have been placed in the forming support, in particular the mold.

As is known, in order to produce a high-quality final container 12, it is known practice to act on a number of parameters such as the production rate "R", the heating power, if applicable the ventilation power, etc. These parameters are control setpoints that are set by an operator at the start of a production phase of a batch of final containers 12. As explained above, in these facilities 10 according to the prior art, the diffusion duration "D" is a constraint that limits the operating range within which the production rate "R" can be controlled.

When the conveying means are formed by gripping members 33 that are mechanically connected to each other, it is not physically possible to vary the diffusion duration "D" independently of the production rate "R".

In addition, even when the chain conveying device 32 was replaced by a linear motor 35, the diffusion duration "D" continued to be considered solely as a constraint and not as a control setpoint that could be controlled independently of the production rate "R".

Structurally, this is reflected in particular by the fact that the distance travelled by the shuttles 34 after they have exited the heating tunnel 27 is in any case too short to make it possible to control the diffusion duration "D" and the production rate "R" independently.

The invention proposes obtaining final containers 12 of identical quality independently of the production rate "R" by guaranteeing that all of the preforms 14 for the production of the same model of final container 12 have an identical diffusion duration "D".

The invention also makes it possible to extend the operating range over which the production rate "R" can be controlled.

To this end, the invention proposes production facilities 100 in which the diffusion path 70 comprises at least one final buffer section 70A that the preforms 14 travel along in an adjustable duration "Da". By adapting said adjustable duration "Da", the diffusion duration "D" can thus be controlled independently of the production rate "R".

Generally, the final buffer section 70A must be long enough to make it possible to vary the adjustable duration "Da" over a significantly large range relative to the diffusion duration "D", as will be explained hereinafter.

The travel duration, referred to as the dependent duration "Db", of the preforms 14 on certain sections, referred to as dependent sections 70B, of the diffusion path 70, can remain in proportion to the production rate "R".

This is in particular the case for the section of the diffusion path 70 corresponding to the receipt of the preforms 14 by the transfer wheel 64. The rotation of the transfer wheel 64 is always synchronized with the rotation of the carousel 54.

This is also the case for the preforms 14 circulating on a conveying device 32 consisting of a closed chain.

Here, the final buffer section 70A is produced by means of a linear motor 35 in which the members 33 for gripping the preforms 14 are mounted on shuttles 34 that travel along a magnetic track 42, similarly to the illustration in FIG. 5. The gripping members 33 can be formed by chucks, as illustrated in FIG. 5, but also by grippers 65 or any other gripping means. The preforms 14 are thus transported along the final buffer section by shuttles 34 moved independently of each other by controlling the magnetic track 42. Such a transport device makes it possible to vary the speed of the shuttles 34 independently of each other and independently of the production rate "R".

According to a variant of the invention not shown, the preforms 14 can be transported along the final buffer section 70A by means of a notched wheel, similar to the input wheel 50, the rotating speed of which can be controlled independently of the production rate "R". This notched wheel can be powered by a conveying device with a linear motor 35 making it possible to adapt the speed of the incoming preforms 14 to the rotating speed of the notched wheel. The preforms 14 are also unloaded from the notched wheel by means of a conveying device with a linear motor 35 making it possible to adapt the speed of the gripping members 33 to the rotating speed of the notched wheel. During the operation of such a notched wheel, all of the notches can be used, or just some of the notches, as a function of the desired adjustable duration "Da".

A plurality of non-limiting embodiments of such production facilities 100 are shown. These production facilities 100 have numerous structural similarities to the production facilities 10 of the prior art described above with reference to FIGS. 1 and 2. Only the differences from the production facilities 10 of the prior art will therefore be described hereinafter.

In the example shown in FIG. 9, a conveying device 72 with a linear motor 35 is interposed between the heating station 26 and the forming station 52. In this embodiment, the transfer wheel 64 has been replaced by the conveying device 72 with a linear motor 35 compared with the production facility 10 in FIG. 1. This embodiment is of course also applicable to a production facility 100 comprising laser heating emitters 28, as illustrated in FIG. 2.

In this embodiment of the invention, the conveying device 32 of the heating station 26 is for example formed by a chain, each link of which holds a gripping member 33. In this case, the section of the diffusion path 70 that extends between the downstream end of the downstream heating section 66B and the exit point 62 of the heating station 26 forms a dependent section 70B that the preforms travel along in a duration "Db" dependent on the production rate "R".

The final buffer section 70A then extends from the exit point 62 of the heating station 26 to the loading point 58 of the forming station 52. The shuttles 34 travel along a closed loop circuit formed by two parallel straight lines connected by 180° bends. The final buffer section 70A extends in particular on one of the straight lines. This form therefore makes it possible for the final buffer section 70A to be long enough to vary the adjustable duration "Da" over a large range of values.

As a variant, when the conveying device 32 of the heating station 26 is formed by a linear motor 35, the entire diffusion path 70 is formed by a final buffer section 70A.

In the example shown in FIG. 10, the conveying device 32 of the heating station 26 is formed by a linear motor 35. In this case, the heating tunnel 27 is advantageously arranged on the upstream straight portion 46A, while the final buffer portion 70A is formed on the downstream straight portion 46C of the loop 46. The final buffer section 70A is thus very long. Here, the preforms 14 are transferred between the heating station 26 and the forming station 52 by a transfer wheel 64 in a duration "Db" dependent on the production rate "R".

In the example shown in FIG. 11, the production facility 100 resembles the one in FIG. 1. The conveying device 32 of the heating station 26 is formed by a linear motor 35. However, the downstream section 66B of the downstream heating path 66 only extends over a small upstream fraction of the downstream straight portion 46C, thus leaving a sufficient length for the final buffer section 70A between the end of the downstream heating path 66 and the exit point 62 of the preforms 14 to the transfer wheel 64. Here, the preforms 14 are transferred between the heating station 26 and the forming station 52 by a transfer wheel 64 in a duration "Db" dependent on the production rate "R".

When the thermal conditioning method is implemented, at the start of production, a diffusion duration "D" setpoint is selected by an operator. The adjustable duration "Da" is automatically controlled by an electronic control unit as a function of the production rate "R" selected in order to maintain a diffusion duration "D" equal to the setpoint independently of the production rate "R".

The diffusion duration "D" setpoint can thus be selected independently of the production rate "R" selected by an operator at the start of production.

In addition, the operator can also intervene during production to vary the production rate "R".

When the diffusion path 70 comprises at least one dependent section 70B, the diffusion duration "D" is equal to the sum of the dependent duration "Db" and the adjustable duration "Da". The adjustable duration "Da" is therefore modified to keep the diffusion duration "D" equal to the setpoint in order to compensate for the variations in the dependent duration "Db". When the production rate "R" increases, the adjustable duration "Da" is automatically extended so as to keep the diffusion duration "D" equal to said setpoint. Conversely, when the production rate "R" is reduced, the adjustable duration "Da" is automatically reduced so that the diffusion duration "D" remains equal to said setpoint.

The adjustable duration "Da" can adopt a plurality of values in a range delimited by a minimum lower limit and an upper limit for a given production rate "R".

As a variant, when the diffusion path 70 is formed solely by a final buffer section 70A, the adjustable duration "Da" is equal to the diffusion duration "D". In this case, the adjustable duration "Da" remains constant independently of the production rate "R" in order to stay equal to the diffusion duration "D" setpoint.

FIG. 12 shows an example of the operation of the production facility 100 for a given production rate "R", for which the adjustable duration "Da" corresponds to its lower limit. By way of non-limiting example, it is the production facility 100 shown in FIG. 11, with operation being similar for the other embodiments of the invention. It will be observed that this lower limit depends on the length of the final buffer section 70A and the maximum speed that the preform 14 can reach at each point of the final buffer section 70A. For this value of the adjustable duration "Da", the preforms 14 circulate spaced very far apart from each other due to the acceleration that they undergo on exiting the heating path 66. The speed of the preforms 14 on the final buffer section 70A is indicated by a vector V1, while the speed of the preforms 14 exiting the heating path 66 is indicated by a vector V0. The speed V0 is substantially lower than the speed V1, which here corresponds to the maximum speed of the shuttles 34 along the final buffer section 70A.

FIG. 13 shows an example of the operation of the production facility 100 for a given production rate "R", for which the adjustable duration "Da" corresponds to its upper limit. It will be observed that this upper limit depends on the length of the final buffer section 70A and the production rate "R". For this value of the adjustable duration "Da", the preforms 14 circulate as close as possible to each other. This upper limit depends on the production rate "R" as the preforms 14 must still circulate fast enough so that a preform 14 arriving from the heating path 66 does not strike the others. The speed of the preforms 14 on the final buffer section 70A is indicated by the vector V1, while the speed of the preforms 14 exiting the heating path 66 is indicated by the vector V0. The speed V0 is substantially equal to the speed V1.

The production rate "R" can be controlled between a maximum rate "Rmax" and a minimum rate "Rmin" during the production of final containers 12. These limits for the production rate "R" depend on a large number of different factors of the diffusion duration "D", in particular the motorization of the conveying means, the power of the heating emitters 28, the forming operation, etc.

However, as explained above, it is possible to adjust the length of the final buffer section 70A and/or the maximum speed of the preforms 14 on the final buffer section 70A in order to obtain a sufficiently wide range of the adjustable duration "Da" so that the diffusion duration "D" can remain constant for all of the production rates "R" between the minimum rate "Rmin" and the maximum rate "Rmax". The length of the final buffer section 70A and/or the maximum speed of the preforms 14 on the final buffer section 70A are thus determined so that the adjustable duration "Da" can be controlled so that at least one diffusion duration "D" value, preferably a range of diffusion duration "D" values, remains constant for any production rate "R" between the maximum rate "Rmax" and the minimum rate "Rmin".

For example, the maximum circulation speed of the preforms on the final buffer section 70A is approximately 5 m/s.

The length of the final buffer section 70A is for example between 0.8 m and 6.8 m.

The diffusion duration "D" is for example between 2.06 s and 9.14 s.

As explained above, so that final containers 12 of the same quality can be obtained, all of the preforms 14 preferably have an identical temperature distribution at the moment of forming. The adjustable duration "Da" is therefore controlled so that the diffusion duration "D" is identical for each preform 14.

In the production facilities 100 shown in FIGS. 9 to 11, the preforms 14 exit one by one from the heating path 66 at the production rate "R" and are transferred one by one in succession into the forming station 52 at said production rate "R" during the transfer step "E3" when they reach the loading point 58. The preforms 14 exit one by one from the heating path 66 at said production rate "R". All of the preforms 14 thus travel along the final buffer section 70A with an identical speed profile. This means that at each point of the diffusion path 70, in particular of the final buffer section 70A, all of the preforms 14 have the same speed of travel.

As a variant, a predetermined number of a plurality of successive preforms 14 form a group, the preforms 14 in single group being transferred simultaneously into the forming station 52 at said production rate "R", corresponding to a number of final containers 12 produced per unit of time. The preforms 14 exit one by one from the heating path 66 at the production rate "R". This means that the first preform 14 in the group must wait for the subsequent preforms 14 in the group to join it before it can proceed to transfer to the forming station 52 at the end of the diffusion path 70. So that all of the preforms 14 are subjected to the same diffusion duration "D", the successive preforms 14 in a single group travel along the final buffer section 70A with different speed profiles so that the diffusion duration "D" is the same for all of the preforms 14 in the group. For example, the preforms 14 in a single group will travel along the final buffer section 70A increasingly slowly so that each preform 14 has the same diffusion duration "D" at the moment of the transfer step "E3".

The first preform 14 in the group thus travels along the diffusion path 70 with a predetermined travel time and it waits for the other preforms 14 at the end of the diffusion path 70 for a predetermined waiting time. The sum of the waiting time and the travel time is equal to the diffusion duration "D". The next preform 14 will have a slightly longer travel time and a slightly shorter waiting time so that the sum of these two times is equal to the diffusion duration "D", and so on for the subsequent preforms 14. The waiting time of the last preform 14 can be negligible depending on the desired diffusion duration "D".

As shown in FIGS. 9 and 11, when the production facility 100 comprises a transition path 68 between two heating sections 66A, 66B, a change in production rate "R" can also influence the way in which the temperature is distributed inside the walls 17 of the preforms 14 before they enter the second heating section 66B. Although this transition path 68 is very short and the influence of a change in production rate "R" on the time that a preform 14 takes to travel along this transition path 68 is marginal, it can be desirable for all of the preforms 14 to travel along this transition path 68 in a duration that can be selected independently of the production rate "R".

To this end, the transition path 68 comprises at least one intermediate buffer section 68A that the preforms 14 travel along in an adjustable duration "Dr" that is controlled independently of the production rate "R".

In the same way as for the final buffer section 70A, this intermediate buffer section 68A is produced by means of a linear motor 35 in which the members 33 for gripping the preforms 14 are mounted on shuttles 34 that travel along a magnetic track 42. The preforms 14 are thus transported along the final buffer section 70A by shuttles 34 moved independently of each other by controlling the magnetic track 42. Such a transport device makes it possible to vary the speed of the shuttles 34 independently of each other and independently of the production rate "R".

According to another variant, the preforms 14 can be transported along the intermediate buffer section 68A by means of a wheel for transporting the shuttles that takes over from the magnetic track 42 to move the shuttles and the rotating speed of which can be controlled independently of the production rate "R". This transport wheel can be powered by a conveying device with a linear motor 35 making it possible to adapt the speed of the incoming preforms 14 to the rotating speed of the transport wheel. This conveying device with a linear motor 35 makes it possible, for example, to transport the preforms 14 on the upstream straight portion 46A of the loop. The preforms 14 are also unloaded from the transport wheel by means of a conveying device with a linear motor 35 making it possible to adapt the speed of the gripping members 33 to the rotating speed of the notched wheel. This conveying device makes it possible, for example, to transport the preforms 14 along the downstream straight portion 46C of the loop. This variant is particularly appropriate when the transition path 68 is formed by a 180° bend portion 46B of the loop, as shown in FIGS. 9 and 11.

It is thus possible to control the adjustable duration "Dr" so that the duration of the intermediate transport step "E1int" is independent of the production rate "R".

The invention very advantageously makes it possible to set a diffusion duration "D" setpoint and a production rate "R" setpoint independently. This makes it possible in particular to improve the quality of the final containers 12.

The invention claimed is:

1. A method for thermally conditioning preforms (14) before they are formed by stretch blow-molding, in a facility (100) for producing containers (12), the method comprising:
at least a first step (E1) of heating each preform (14) by transport along a heating path (66) exposed to heat radiation, the preforms (14) exiting the heating path (66) at a predetermined production rate (R);
a second step (E2) of diffusing the heat stored in each preform during which the preforms (14) are transported in a line along a diffusion path (70) that is not exposed to the heat radiation and extends from a downstream end of the heating path (66) to a station (52) for forming the preforms (14); and
a third step (E3) of transferring the preforms, following the diffusion step (E2), into forming units (56) of the forming station (52) at said predetermined production rate (R),
wherein the diffusion path (70) comprises at least one final buffer section (70A) that the preforms (14) travel along in an adjustable duration (Da).

2. The method of claim 1, wherein a duration of the diffusion step (D) is controlled independently of the production rate (R) by adapting the adjustable duration (Da).

3. The method of claim 1, wherein a diffusion duration (D) setpoint is selected, the adjustable duration (Da) being controlled automatically as a function of the production rate (R) to keep the diffusion duration (D) equal to the setpoint independently of the production rate (R).

4. The method of claim 1, wherein the adjustable duration (Da) is controlled so that the diffusion duration (D) is identical for each preform.

5. The method of claim 4, wherein the preforms are transported along the final buffer section (70A) by shuttles (34) moved independently of each other by means of a linear motor (35).

6. The method of claim 5, the preforms (14) travel along the final buffer section (70A) with an identical speed profile.

7. The method of claim 1, wherein the adjustable duration (Da) can adopt a plurality of values in a range delimited by a minimum lower limit and an upper limit for a given production rate (R).

8. The method of claim 7, wherein the minimum lower limit depends on a length of the final buffer section and a maximum speed that the preform can reach at each point of the final buffer section.

9. The method of claim 7, wherein the upper limit depends on a length of the final buffer section and the production rate (R).

10. The method of claim 1, the production rate (R) can be controlled between a maximum rate (Rmax) and a minimum rate (Rmin) during the production of containers (12), the length of the final buffer section (70A) and/or the maximum speed of the preforms (14) on the final buffer section (70A) being determined so that the adjustable duration (Da) is controlled so that at least one diffusion duration (D) value can remain constant for any production rate (R) between the maximum rate (Rmax) and the minimum rate (Rmin).

11. The method of claim 1, wherein the preforms (14) are transferred one by one in succession into the forming station (52).

12. The method of claim 1, wherein a predetermined number of a plurality of successive preforms (14) form a group, the preforms in a single group being transferred simultaneously into the forming station (52).

13. The method of claim 12, wherein the successive preforms (14) in a single group travel along the final buffer section (70A) with different speed profiles so that the diffusion duration (D) is the same for all of the preforms (14) in the group.

14. The method of claim 1, wherein the heating step (E1) comprises two successive heating sub-steps (E1A, E1B) prior to the diffusion step (E2), the two heating sub-steps (E1A, E1B) being separated by an intermediate step (E1*int*) of transporting the preforms in a line, the heating path (66) being divided into an upstream heating section (66A) and a downstream heating section (66B) connected by a transition path (68).

15. The method of claim 14, wherein the transition path (68) comprises at least one intermediate buffer section (68A) that the preforms (14) travel along in an adjustable duration (Dr) that is controlled independently of the production rate (R).

* * * * *